United States Patent
Knitl et al.

(10) Patent No.: US 6,928,155 B1
(45) Date of Patent: Aug. 9, 2005

(54) PROCESS FOR INCLUDING FUNCTIONS OF AN AUTOMATIC CALL DISTRIBUTOR SYSTEM IN AN INTERACTIVE VOICE RESPONSE SYSTEM

(75) Inventors: Reinhard Knitl, München (DE); Alois Ranzinger, München (DE); Alexander Schliwa, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,101

(22) PCT Filed: Aug. 13, 1997

(86) PCT No.: PCT/DE97/01730

§ 371 (c)(1),
(2), (4) Date: Mar. 1, 1999

(87) PCT Pub. No.: WO98/09424

PCT Pub. Date: Mar. 5, 1998

(30) Foreign Application Priority Data

Aug. 30, 1996 (DE) ................................ 196 35 329

(51) Int. Cl.⁷ ........................... H04M 3/00; H04M 5/00
(52) U.S. Cl. ........................... 379/265.01; 379/265.02; 379/265.05; 379/265.09; 379/266.07; 379/210.01; 379/214.01
(58) Field of Search ............................... 379/219, 223, 379/258, 260, 262, 263, 264, 265, 266, 267, 379/88.01, 265.01, 265.02, 265.04, 265.05, 379/265.09, 265.1, 266.07, 266.08, 210.01, 379/214.01

(56) References Cited

U.S. PATENT DOCUMENTS

| | | | | |
|---|---|---|---|---|
| 4,510,351 A | * | 4/1985 | Costello et al. ................ | 179/27 |
| 4,696,028 A | * | 9/1987 | Morganstein et al. ..... | 379/88.24 |
| 5,020,095 A | * | 5/1991 | Morganstein et al. ......... | 379/67 |

(Continued)

FOREIGN PATENT DOCUMENTS

| | | |
|---|---|---|
| DE | 195 35 540 C1 | 12/1996 |
| EP | 0 245 028 | 11/1987 |
| EP | 0 426 361 A2 | 5/1991 |
| EP | 0 515 068 A2 | 11/1992 |
| EP | 0 611 135 A1 | 8/1994 |
| GB | 2 273 853 | 6/1994 |

OTHER PUBLICATIONS

Conversant VIS Listens and Talks to Your Customers, Cordom, et al. pp. 22-25.
Conversant 1 Voice System: Architecture and Applications, Perdue et al.
Dialogic's AMX/81 Family of Audio Multiplexer Products, Stahl, pp. 80-83.

*Primary Examiner*—Allan Hoosain
(74) *Attorney, Agent, or Firm*—Bell Boyd & Lloyd LLC

(57) ABSTRACT

A method for incorporating functions of an automatic call distribution system into an interactive voice answering system wherein the interactive voice response system coupled to an automatic call distribution system is influenced by communication terminal equipment such that a request for reserving an available agent to the automatic call distribution system is communicated. Given the reservation of a requested agent, the allocated communication system is influenced such that the communication terminal equipment is transferred to the reserved agent communication terminal equipment.

27 Claims, 2 Drawing Sheets

U.S. PATENT DOCUMENTS

| | | | |
|---|---|---|---|
| 5,036,535 A * | 7/1991 | Gechter et al. | 379/210 |
| 5,097,528 A | 3/1992 | Gursahaney et al. | 379/88.21 |
| 5,155,761 A * | 10/1992 | Hammond | 379/88.2 |
| 5,164,981 A | 11/1992 | Mitchell et al. | 379/88.01 |
| 5,309,505 A * | 5/1994 | Szlam et al. | 379/88 |
| 5,309,513 A * | 5/1994 | Rose | 379/265 |
| 5,521,966 A * | 5/1996 | Friedes et al. | 379/91.02 |
| 5,546,452 A | 8/1996 | Andrews et al. | 379/219 |
| 5,555,299 A * | 9/1996 | Maloney et al. | 379/212 |
| 5,627,884 A * | 5/1997 | Williams et al. | 379/88 |
| 5,696,809 A * | 12/1997 | Voit | 379/5 |
| 5,703,943 A * | 12/1997 | Otto | 379/265 |
| 5,740,240 A * | 4/1998 | Jolissaint | 379/265 |
| 5,915,010 A * | 6/1999 | McCalmont | 379/212 |

* cited by examiner

PROCESS FOR INCLUDING FUNCTIONS OF AN AUTOMATIC CALL DISTRIBUTOR SYSTEM IN AN INTERACTIVE VOICE RESPONSE SYSTEM

BACKGROUND OF THE INVENTION

The present invention relates to an interactive voice response system which is coupled to an automatic call distribution system wherein communication termination equipment communicates a request for reserving an available agent to the automatic call distribution system and the communication terminal equipment is transferred to the reserved agent communication terminal equipment.

Interactive voice answering systems (known as interactive voice response units in this technical field) can be connected to communication systems; particularly, large private communication systems. An interactive voice response system is disclosed, such as, by European Patent Application 0 611 135 A1. A voice response system can be called and controlled by arbitrary communication terminal equipment connected to the communication system or communication terminal equipment switched via further communication systems. Information, for example digitalized voice information about articles of a concern, are usually controlled or, called in the interactive voice response system dependent on the inputs of the calling communication terminal equipment. Thus, for example, one of a plurality of offered or, callable pieces of information can be selected by a keyboard input or a voice input. The selected information is automatically forwarded as voice information from the voice response system to the calling communication terminal equipment, or, the calling subscriber, and is acoustically reproduced thereat.

Further, automatic call distribution systems also can be connected to communication systems; particularly, private communication systems. An automatic call distribution system is disclosed, for example, by DE 195 35 540 A1. Agent communication terminal equipment connected to the communication system is allocated to an automatic call distribution system. Incoming calls having a prescribed telephone number, such as a group telephone number, are forwarded to the automatic call distribution system by the communication system wherein free agent communication terminal equipment is identified. The automatic call distribution system subsequently influences the communication system in such a way that the incoming call is transferred over to the free agent communication terminal equipment.

Given calls to an interactive voice response system by the communication terminal equipment of the communication network, situations occur due to the limited scope of the voice response unit wherein calling communication terminal equipment or, respectively, a calling subscriber does not receive the desired information. In these cases, it would be advantageous to involve a person—referred to below as agent into the respective connection who can provide the information.

U.S. Pat. No. 5,164,981 discloses an interactive voice response system that is connected both to a communication system as well as to a data exchange. Operator terminals, to which a list of connection information that was determined by the voice response system in the connection setup of an incoming call is communicated with the assistance of a switching equipment, are connected to the data exchange.

The publication by M. Stahl, Dialogic's AMX/81 Family of Audio Multiplexer Products", Speech Technology, MAN MACHINE VOICE COMMUNICATIONS, 1987, discloses a system configuration wherein an incoming call is first communicated to a voice response system. An automatic call distribution system is not connected to a communication system. Potentially under the control of the voice response system, the incoming calls are forwarded to the automatic call distribution system or, respectively, to the connected agents or agent communication terminal equipment.

U.S. Pat. No. 5,546,452 discloses a communication system whereby interactive voice response systems are connected to a central controller that is connected to a communication network. Incoming calls are thereby sent by the central controller to available interactive voice response units and are processed thereat.

SUMMARY OF THE INVENTION

A key aspect of the inventive method is that the interactive voice response system and the automatic call distribution system are directly coupled, and the interactive voice response system is influenced by calling communication terminal equipment such that a request for reserving an available agent or, respectively, agent communication terminal equipment is communicated to the automatic call distribution system. Given the reservation of a requested agent or, agent communication terminal equipment by the automatic call distribution system, the allocated communication system can be influenced such that the affected communication terminal equipment is transferred to the available agent communication terminal equipment. With the assistance of the inventive method, therefore, connections that the communication terminal equipment u of the communication network has set up to an interactive voice response system are transferred with the assistance of the communication system insofar as the request for reserving the agent communication terminal equipment yields that an available agent or, agent communication terminal equipment was capable of being reserved. As a result of the direct coupling of the interactive voice response system and of the automatic call distribution system, the request for reserving an available agent can be implemented without influencing the communication system; only the transfer of the already existing connection is implemented by the communication system.

Preferably, the interactive voice response system and the automatic call distribution system are coupled via a local network wherein interfaces for connection to the local network are provided in the interactive voice response system and in the automatic call distribution system. Given the employment of a local network, for example, a plurality of interactive voice response systems (say of different companies) can be connected to a single automatic call distribution system.

Given a request for reservation by the interactive voice response system, the status of at least one of the agents or, respectively, of the agent communication terminal equipment of the automatic call distribution system can be advantageously interrogated, and the request for reserving an agent or, respectively, agent communication terminal equipment can be implemented dependent on the currently interrogated status of the at least one agent or, respectively, agent communication terminal equipment. This means that a status inquiry can be implemented before a request for reserving a free agent or, respectively, agent communication terminal equipment but a status inquiry need not necessarily precede. The inquiry of the status of the agent or, respectively, agent communication terminal equipment can trigger a great variety of successor agents. For example, the non-availability of agent or, respectively, agent communication terminal equipment is communicated to the communication terminal equipment connected to the interactive voice response system. This communication terminal equipment subsequently depositsa call-back request at the interactive voice response system in order to set up a connection to the affected communication terminal equipment, or some other arbitrary communication terminal equipment that has communicated a call-back request to the interactive voice response system, and to connect this to the reserved agent communication terminal equipment.

According to another embodiment of the present invention, the interactive voice response system cyclically interrogates the status of at least one agent or, agent communication terminal equipment of the automatic call distribution system, and a request for reserving an agent or, agent communication terminal equipment is implemented dependent on the interrogated statuses of the agents or, agent communication terminal equipment. Given a cyclical, i.e., periodic interrogation of the status of the agents or, agent communication terminal equipment, the reservation given a connection request of communication terminal equipment or given the presence of a call-back request can be initiated given availability of the affected communication terminal equipment.

Preferably, the transfer of the affected communications terminal equipment to the reserved agent communication terminal equipment in the communication system is effected by performance features of call-back and transfer initialized by the interactive voice response system. The telephone number of the reserved agent communication terminal equipment is to be co-supplied for the call-back, wherein this is communicated by the message exchange described below.

According to another embodiment of the present invention, a call back request communicated from the affected communication terminal equipment given agents or, agent communication terminal equipment that are not currently available is marked in the interactive voice response system with the telephone number information of the affected communication terminal equipment and an automatic call back is initiated with the assistance of a further request for reservation of an available agent or, agent communication terminal equipment. As such, the connection to the reserved agent or, agent communication terminal equipment is produced first and a call back connection to the affected communication terminal equipment is subsequently produced and handed over. The call back request, alternatively, can be stored in an auxiliary means for example, a host computer that is additionally connected to the local network.

Preferably, the inquires are realized by requests and acknowledgments of these requests. A request an acknowledgment by a request, or an acknowledgment function code is advantageous, as is version information indicating the current version of the equipment communicating the request or acknowledgment, an identification identifying an automatic call distribution system, an identification identifying an interactive voice response system, reference information that unambiguously identifies a request and at least one request or acknowledgment-dependent parameter. All requests and acknowledgments described below are structured according to this format. The different requests or acknowledgments only differ on the basis of the indicated function code or in the nature and quantity of the parameters.

Advantageous developments of the individual requests such as logon requests, log off requests, status requests, reservation requests and enable requests as well as the appertaining acknowledgements, are contemplated as alternative embodiments. Advantageous developments of a communication arrangement for the involvement of functions of an automatic call distribution system in an interactive voice response system are also considered in yet further embodiments of the present invention.

Additional features and advantages of the present invention are described in, and will be apparent from, the Detailed Description of the Invention and the Figures.

DETAILED DESCRIPTION OF THE INVENTION

Figure 1:
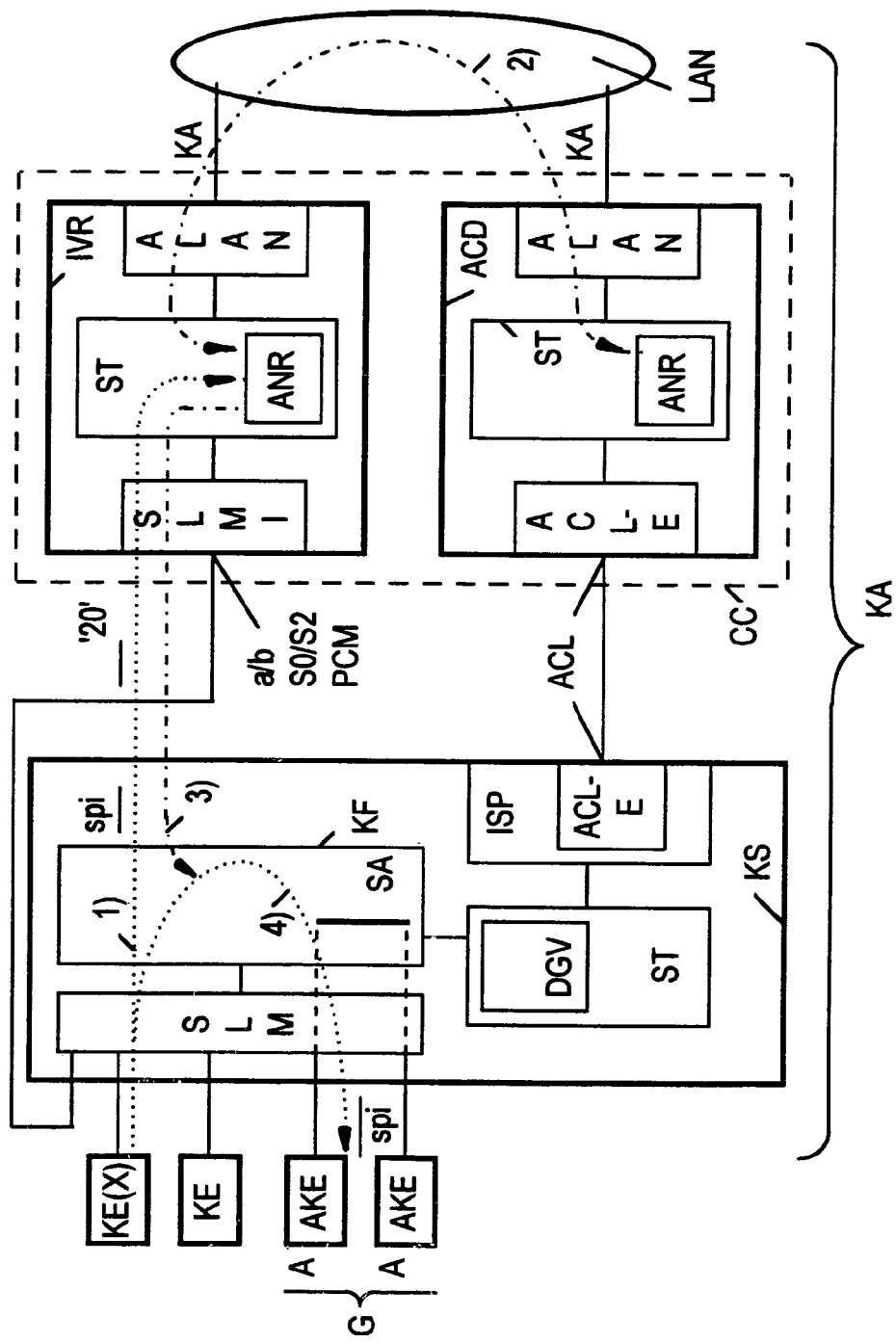
FIG. 1 shows the communication arrangement of the present invention in block diagram form.

FIG. 1 shows a communication arrangement KA of the present invention wherein an interactive voice response system IVR and an automatic call distribution system ACD are connected to a communication system KS. The interactive voice response system IVR is referred to below as IVR system IVR and the automatic call distribution system ACD is referred to below as ACD system ACD. The communication system can be part of a communication network (not shown), wherein these are connected to one another via trunk lines (not shown). For connecting the ACD system ACD to the communication system KS, an ACL interface ACL is respectively provided therein such that the ACL interface ACL in the communication system KS is realized in an indicated administration and maintenance server ISP and in an ACL unit ACL-E in the ACD system ACD. The abbreviation ACL stands for applications, activity link and means that a communication exchange for an application-dependent call control is link-controlled via this ACL interface ACL. A controller ST, wherein the automatic call distribution functions are rrealized, is provided as application-dependent connection controller in the ACD system ACD.

A control means ST that is connected to a switching matrix KF and to the indicated administration and maintenance server ISP is provided in the communication system KS for the switching-oriented as well as administration and maintenance-oriented control. In addition to the critical switching and administration and maintenance-oriented programs (not shown), a program structure DGV for a collaboration with the ACD system ACD is implemented in the control means ST.

With the assistance of the control means ST, for example, a group terminal SA for the connection of agent communication terminal equipment AKE is configured in the switching matrix KF. The agent communication terminal equipment AKE allocated to a group terminal SA, for example, forms a group G of agent communication terminal equipment AKE. The agent communication terminal equipment AKE and further communication terminal equipment KE connected to the communication system KS are connected to a subscriber line module SLM that is, in turn, connected to the switching matrix KF. The physical and procedural matching of the internal communication system conditions to the specific requirements of the communication terminal equipment for example ISDN conditions occurs in the subscriber line modules SLM.

An IVR system IVR is additionally connected to this subscriber line module SLM formed, for example, by a plurality of connection modules. A subscriber line module SLMI is provided in the IVR system IVR for matching to the internal system conditions. The interface between the communication system KS and the IVR system IVR is realized, for example, according to an analog a/b telephony interface a/b or according to a PCM multiplex interface; for example, by a PCM30 system or, alternatively, according to the ISDN base or primary interface SO/S2. The realization is essentially dependent on the type of communication terminal equipment KE, AKE connected to the communication system KS and on their plurality; i.e., the ISDN primary interface S2 or a PCM multiplex interface PCM is advantageous given larger communication systems KS.

Both in the automatic call distribution system ACD as well as in the IVR system IVR, a central controller ST is provided wherein an inquiry routine ANR realized program-oriented is respectively implemented in addition to the routines realizing the critical functions of automatic call distribution or, respectively, voice response. For the procedural and physical connection of the ACD system ACD and of the IVR system IVR to a local network LAN, a respective network interface unit ALAN is provided in these. The network interface unit ALAN is respectively connected at the system side to the controller ST of the IVR or, respectively, ACD system IVR, ACD. A respective communication terminal KA is realized for connection to the local network LAN. The local network LAN can be formed by a bus or ring or by a star network. Network access methods such as, for example, the CSMA/CD (carrier sense multiple access with collision detection) or the token ring access method are thereby possible. Both represent methods standardized according to ANSI/IEEE for access to a local bus, star or ring network. The interface means ALAN is to be realized in conformity with the local network LAN employed. Given, for example, a local bus network, the interface means ALAN is to be realized in view of the access protocol and of the physical embodiment of the communication connection KA according to IEEE Standard 802.3 based on the CSMA/CD method. The interface means ALAN, further, match the information communicated via the local network LAN to the internal conditions of the IVR or, respectively, ACD system IVR, ACD in view of their physical and procedural properties. As such, the internal conditions can be the same for both systems IVR, ACD. The IVR system IVR and the ACD system ACD can be combined in a "call center CC", as indicated by a broken line in FIG. 1.

Let it be assumed for the exemplary embodiment that the communication terminal equipment KE(X) sets up a connection to the IVR system IVR—indicated in FIG. 1 by a dotted line referenced 1). Let it also be assumed that, following a voice presentation of the IVR system IVR, different information is called at this communication terminal equipment KE(X) by keyboard inputs, these being communicated to the communication terminal equipment KE(X) as voice information spi. Let it also be assumed for this exemplary embodiment that the IVR system IVR cannot automatically supply the information requested by the communication terminal equipment KE(X) or subscriber, but requires an information person, i.e. an agent A or an agent communication terminal equipment AKE for this purpose. In order to obtain the involvement of an agent or of an automatic call distribution function, for example, the IVR system IVR is informed by the communication terminal equipment KE(X) by a specific keyboard input (for example, the numeral 20) that an agent A is to be involved for information that the interactive voice response system cannot supply.

The inquiry routine ANR implemented in the controller ST of the IVR system IVR subsequently directs an inquiry realized by requests a and acknowledgments q to the automatic call distribution system ACD via the local network LAN. The J c general inquiry is indicated with dot-dashed lines referenced 2) in FIG. 1. After reserving an available free agent A or a free agent communication terminal equipment AKE, the inquiry routine ANR implemented in the controller ST of the IVR system IVR activates the performance feature of call back and transfer for the affected communicated terminal equipment KE(x). Pursuant to this, the telephone number of the reserved agent communication terminal equipment AKE communicated in the framework of the inquiry is provided; indicated in FIG. 1 by a dot-dashed line referenced 3). Due to the activation of the two performance features of call back and transfer, the communication system KS effects a transfer of the communication terminal equipment KE(X) from the IVR system IVR to the reserved agent A or the reserved agent communication terminal equipment AKE; indicated by a dotted line referenced 4) in FIG. 1. Given this procedure, the ACD system ACD and the communication system KS are minimally loaded.

Figure 2:
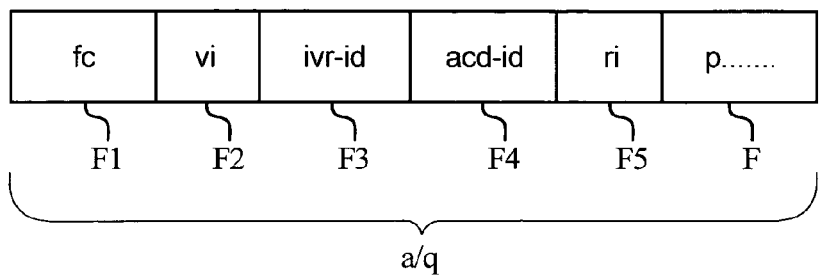
FIG. 2 shows the structure of requests or, respectively, acknowledgments in block diagram form.

The inquiries with respect to an available agent or agent communication terminal equipment AKE are realized with the greatest variety of requests a and acknowledgments q which are based on a uniform request/acknowledgment format. This uniform request/acknowledgment format is schematically shown in FIG. 2. The message-oriented requests a or acknowledgments q include a first field F1 in which a request or acknowledgment function code fc is entered. The type of request a or acknowledgment q is indicated by this request or, respectively, acknowledgment function code sc. Version information vi optionally can be entered into a second field f2 which indicates the current version of the system—either the IVR system IVR or the ACD system ACD—that communicates the request or the acknowledgment a, q. The optionally insertable version information vi serves for tracing and diagnostic purposes and has no significance for an evaluation or interpretation of a request a or of an acknowledgment q.

An identification acd-id, ivr-id that identifies an ACD system ACD or an IVR system IVR is entered into a third or fourth field F3, F4. For example, the names (i.e., the designations of the respective system IVR, ACD) are provided as identifications acd-id, ivr-id. For unambiguous identification of a request a or of an acknowledgment q, a reference information ri or a reference number is entered into a fifth field F5. This reference information ri is entered into acknowledgments q that acknowledge a request a in order to assure the affiliation of the acknowledgment q to the respective requests a. In a last field F, request-dependent or, respectively, acknowledgment-dependent parameters p are entered. Dependent on the type of request a or acknowledgment q, different parameters p are inserted into the field F that includes only a few bytes or a plurality of bytes as well.

The possible requests a as well as acknowledgment q directed from the IVR system IVR to the ACD system ACD are listed below. A different function code fc that, for example, is indicated by a four-place ASCII value (0100, 0200 . . . ) is thereby provided for each different, listed request a or acknowledgment q.

Logon Request lona:

Each IVR system IVR that wishes to communicate with an ACD system ACD via the local network LAN must log on at this network with a logon request lona and must be authorized with a password pass. The ACD system ACD checks whether the communicated identification ivr-id is known to it and, likewise, whether the password pass has been forwarded or, respectively, whether the access protection information is allocated to this identification ivr-id.

Logon Acknowledgment lonq:

As a reply to a logon request Iona, the ACD system ACD communicates a logon acknowledgment lonq to the IVR system IVR via the local network LAN. The result information ei inserted as parameter p in the field F provides the IVR system IVR with information as to whether its application is accepted or why this is being rejected. Possible grounds for rejection are, for example, an invalid password pass, a known identification ivr-id or an application that was already implemented.

Log Off Request lofa:

The IVR system IVR logs off at the ACD system ACD with this log off request.

Log Off Acknowledgment logq:

The log off request lofa is acknowledged by the ACD system ACD with this log off acknowledgment logq. A result information ei inserted as parameter p provides information whether the logon request lofa was accepted or, respectively, for what reasons it is being rejected. Grounds for rejection, for example, correspond to those in the logon acknowledgment lonq.

Status Request staa:

The term status of a group of agents A or, respectively, group of agent communication terminal equipment AKE is requested at the ACD system ACD with this status request staa. For example, the group G is not directly indicated; rather, the service information si is inserted into the field F as parameter p. The service information si, for example, is represented by service numbers, wherein the service numbers, for example, represent different technical fields such that different service numbers themselves can be allocated to a group G of agents A.

Status Acknowledgment staq:

The status acknowledgment staq represents the reply message to a status request staa and is communicated to the IVR system IVR from the ACD system ACD via the local network LAN. The following information can be inserted as parameters p into the field F:
  a result information ergi that indicates that admissibility of the status request staa or provides information whether the status request staa is accepted or rejected. The reasons, for example, are those in the aforementioned acknowledgments lonq, lonfq.
  Status information zusi indicates the operating status in which the ACD system ACD is, for example, day/night operation or in an initialization condition.
  The number of agents A or agent communication terminal equipment AKE logged on at the ACD system ACD is indicated by the reported information amei.
  The number of free agents A or of free agent communication terminal equipment AKE of the group G defined by the respective service information si is indicated by the agent information agi.
  A busy information bell indicates the number of busy agents A or agent communication terminal equipment AKE.
  An availability information vfbi indicates the number of unavailable agents A or agent communication terminal equipment AKE.
  Additional information such as, for example, the agents A busy with post-processing or statistical information about the number of waiting calls, etc., can be optionally inserted. The information listed above are evaluated or interpreted in the IVR system IVR and a successor action can be derived. A significant successor action or decision is to be seen therein as to whether a free agent A or a free agent communication terminal equipment AKE at the moment is to be reserved or not reserved.

Reservation Request resa:

This reservation request resa serves to reserve agents A or agent communication terminal equipment AKE that is subsequently transferred to the communication terminal equipment KE(x) currently calling at the IVR system IVR with the assistance of the communication system KS.

A reservation request resa can contain the following information as parameters p in the field F:
  An arbitrary agent A or arbitrary agent communication terminal AKE is requested for a reservation from a group G of agents or agent communication terminal equipment AKE defined by the service information si, being requested by an inserted service information si. A reservation means that the respective agent A or the respective agent communication terminal equipment AKE will no longer be transferred to further incoming calls.
  The reservation of a specific person, i.e. specific agent A, [. . . ] by the agent identification agid is requested with an inserted agent identification agid, wherein the allocated agent communication terminal equipment AKE is automatically defined.
  The waiting information wari indicates the time span, for example in seconds, that should be maximally waited when a specific agent A or an arbitrary agent A of a group G cannot be immediately reserved. After the lapse of this time span, a reservation of a specific or arbitrary agent A is foregone.
  The IVR system IVR is informed of a reservation of the respective agent or agent communication terminal equipment AKE that is not immediately possible on the basis of an inserted status information stai.

Reservation Acknowledgment resq:

This message represents the acknowledgment in response to a reservation request resa. The following information is inserted as parameter p into the field F.
  Result information regi that indicates the admissibility of the reservation request resa or provides information whether the reservation request resa is accepted or rejected.
  Service information si that is taken from the reservation request resi.
  Agent information agid with which a specific person, i.e. a specific agent A or a specific agent communication terminal equipment AKE, is defined.
  The IVR system IVR is informed by the agent status information asti as to what status the requested agent A or the requested agent communication terminal equipment AKE has. Possible statuses are, for example, agent A is not logged on, agent A is not available, agent A is already reserved, etc.

Release Request frea:

This release request frea can be communicated both giving ongoing reservation of an agent A or a reservation of an agent A that has already ended. As such, a release request frea respectively effects the immediate release of an agent A or agent communication terminal equipment AKE that is reserved or is being reserved.

Display Request anza:

As a result of a display request anza, text that is sent along by the IVR system IVR can be communicated via the ACD system ACD to a specific agent or to specific agent communication terminal equipment AKE, whereby an attention tone can be acoustically reproduced at the respective agent communication terminal equipment AKE. In order to avoid collisions with other display possibilities, this display request anza should only be employed for agent communication terminal equipment AKE that is already reserved. The agent identification agid of the defined agent A or agent communication terminal equipment AKE, the information text to be communicated and, optionally, the time information zei and attention information aufi, can be inserted in the field F as parameters p. The timing information zei indicates the display time of the information text at the specific agent communication terminal equipment AKE, and the attention information effects that an attention tone is acoustically reproduced at the specific agent communication terminal equipment AKE.

Figure 3:
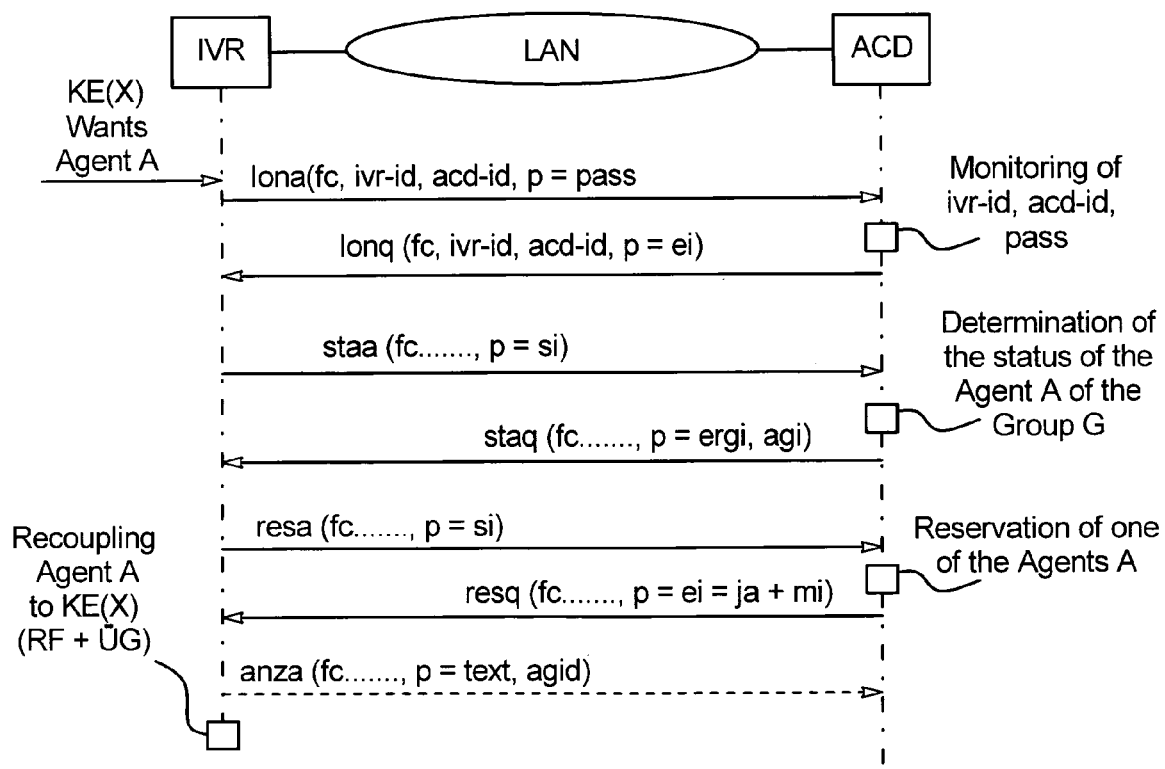
FIG. 3 shows a possible executive sequence scenario in the form of a flowchart.

With reference to a flowchart, FIG. 3 shows a possible executive sequence scenario wherein the IVR system IVR first reports at the ACD system ACD with a logon request lona and the admissibility of the logon is acknowledged by a logon acknowledgment lonq. In order to determine the general status of agents A or agent communication terminal equipment AKE of a group G, a status request staa with service information si, wherein the affected group G is addressed, is communicated. For example, event information ergi that indicates a successful status inquiry is inserted in the status acknowledgment staq communicated to the IVR system IVR. Agent information agi indicating the plurality of free agents A in the group G is also inserted. For example, the number 3 is inserted for three free agents. Subsequently, the IVR system IVR communicates a reservation request resa with the same service information si to the ACD system ACD, whereupon one of the free agents A is reserved therein. The reservation is acknowledged by a reservation acknowledgment resq, wherein a successful reservation is indicated as event information ei and a telephone number information RNI is inserted with which the reserved agent A or the reserved agent communication terminal equipment AKE is addressed. In order to communicate information about the preceding dialog of the calling communication terminal equipment KE(X) with the IVR system IVR to the agent A, the registrations are inserted into a display request anza as information text and are communicated via the ACD system ACD and the communication system KS to the reserved agent AKE—indicated by a broken line in FIG. 3.

The following variations are no longer shown in FIG. 3 but can, nonetheless, be implemented on the basis of the request a and acknowledgment q indicated there. When no agent A is free, the IVR system IVR informs the calling communication terminal equipment KE(X) of this and offers two alternatives; namely, waiting until an agent A is free or activating a call back. In both cases, the IVR system IVR communicates status requests staa in order to find out whether an agent A has become free. When one has become free, the reservation of the free agent A is initiated giving a waiting, calling communication terminal equipment KE(X) and, given an activation of the call back, a connection to the originally calling communication terminal equipment KE(X) is previously set up, wherein a connection to the affected communication terminal equipment KE(X) or an arbitrarily other communication terminal equipment that informed the IVR system IVR of a call back wish is set up and is subsequently connected to the reserved agent communication terminal equipment AKE.

A completely different procedure is incorporated therein that the IVR system IVR cyclically, i.e. periodically, communicates status requests staa to the ACD system ACD in order to determine whether agents A in groups G are busy or free. According to a first version, the reservation of one of the free agents A is immediately initiated given the presence of an allocation wish of an agent A of a communication terminal equipment KE and the connection is then reconnected through the IVR system IVR. Given an allocation wish of a free agent A of a communication terminal equipment KE(X) that has already cleared down the connection to the IVR system IVR, this sets up the connection when a free agent A has been found, wherein the free agent A is subsequently reserved and the connection to this free agent is transferred.

Although the present invention has been described with reference to specific embodiments, those of skill in the art will recognize that changes may be made thereto without departing from the spirit and scope of the invention as set forth in the hereafter appended claims.

What is claimed is:

1. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment; and transferring, given the request for reserving, and reservation of, the agent communication terminal equipment, by the communication system and outside of the automatic call distribution system the communication terminal equipment from the interactive voice response system to the reserved agent communication terminal equipment.

2. A method for incorporating functions of an automatic call distribution system in an interactive voice response system as claimed in claim 1, further comprising the steps of:

providing interfaces to both the interactive voice response system and the automatic call distribution system; and coupling the respective interfaces of the interactive voice response system and the automatic call distribution system via a local area network.

3. A method for incorporating functions of an automatic call distribution system in an interactive voice response system as claimed in claim 1, further comprising the steps of:
interrogating a status of the agent communication terminal equipment by the interactive voice response system before the request for reserving is communicated; and
implementing the request for reserving dependent on the interrogated status.

4. A method for incorporating functions of an automatic call distribution system in an interactive voice response system as claimed in claim 1, further comprising the steps of:
cyclically interrogating a status of the agent communication terminal equipment by the interactive voice response system before the request for reserving is communicated; and
implementing the request for reserving dependent on the cyclically interrogated status.

5. A method for incorporating functions of an automatic call distribution system in an interactive voice response system as claimed in claim 1, further comprising the steps of:
noting, given an unavailable agent communication terminal equipment, a call back request communicated from an associated communication terminal equipment in the interactive voice response system with telephone number information associated with the communication terminal equipment; and
initiating an automatic call back with assistance from a further request for reserving, wherein a connection to the reserved agent communication terminal equipment is produced and transferred first and a call back connection to the associated terminal equipment is produced and transferred thereafter.

6. A method for incorporating functions of an automatic call distribution system in an interactive voice response system as claimed in claim 1, further comprising the step of:
effecting transfer of the communication terminal equipment to the reserved agent communication terminal equipment by performance features of call back and transfer initialized by the interactive voice response system.

7. A method for incorporating functions of an automatic call distribution system in an interactive voice response system as claimed in claim 1, further comprising the step of:
providing a request and an acknowledgment for each request for reserving between the interactive voice response system and the automatic call distribution system.

8. A method for incorporating functions of an automatic call distribution system in an interactive voice response system as claimed in claim 7, further comprising the step of:
providing request information associated with the request, the request information including a request function code, version information indicating a current version of the interactive voice response system communicating the request, identification identifying the respective automatic call distribution system, identification identifying the respective interactive voice response system, reference information identifying the request, and at least one request-dependent parameter.

9. A method for incorporating functions of an automatic call distribution system in an interactive voice response system as claimed in claim 7, further comprising the step of:
providing acknowledgment information associated with the request, the acknowledgment information including an acknowledgment function code, version information indicating a current version of the automatic call distribution system communicating the acknowledgment, identification identifying the respective automatic call distribution system, identification identifying the respective interactive voice response system, reference information identifying the acknowledgment, and at least one acknowledgment-dependent parameter.

10. A method for incorporating functions of an automatic call distribution system in an interactive voice response system as claimed in claim 1, further comprising the steps of:
inserting access protection information in a logon request;
communicating the logon request to log the interactive voice response system on at the automatic call distribution system;
inserting a check result of the logon request in a logon acknowledgment; and
answering the logon request by the automatic call distribution system with the logon acknowledgment.

11. A method for incorporating functions of an automatic call distribution system in an interactive voice response system as claimed in claim 1, further comprising the steps of:
inserting access protection information in a log off request;
communicating the log off request to log the interactive voice response system off at the automatic call distribution system;
inserting a check result of the log off request in a log off acknowledgment; and
answering the log off request by the automatic call distribution system with the log off acknowledgment.

12. A method for incorporating functions of an automatic call distribution system in an interactive voice response system as claimed in claim 1, further comprising the steps of:
inserting service information, in a status request, indicating a requested agent communication terminal equipment as a parameter; and
communicating the status request, which includes the parameter, of the associated automatic call distribution system from the interactive voice response system to the automatic call distribution system.

13. A method for incorporating functions of an automatic call distribution system in an interactive voice response system as claimed in claim 12, further comprising the step of:
communicating a status acknowledgment from the automatic call distribution system after the step of communicating a status request, wherein the status acknowledgment includes at least one of result information indicating a check of allowability of the status request, status information indicating an operating condition of the automatic call distribution system, agent information indicating the agent communication terminal equipment, report information indicating the agent communication terminal equipment, busy information indicating the agent communication terminal equipment, and availability information indicating the availability of the agent communication terminal equipment.

14. A method for incorporating functions of an automatic call distribution system in an interactive voice response system as claimed in claim 1, further comprising the step of:
   inserting in the reservation request a parameter which includes at least one of service information requesting an arbitrary agent communication terminal equipment of a group of agent communication terminal equipment, waiting information indicating a time span for waiting for one of a group of agent communication terminal equipment, and status information indicating one of the reporting and non-reporting of the status of the reservation request.

15. A method for incorporating functions of an automatic call distribution system in an interactive voice response system as claimed in claim 14, further comprising the step of:
   communicating a reservation acknowledgment from the automatic call distribution system after the step of communicating a reservation request, wherein the reservation acknowledgment includes at least one of event information indicating a check of allowability of the reservation request, service information indicating a group of agent communication terminal equipment, telephone number information indicating a telephone number of the agent communication terminal equipment, and agent status information indicating the status of the requested agent communication terminal equipment.

16. A method for incorporating functions of an automatic call distribution system in an interactive voice response system as claimed in claim 14, further comprising the steps of:
   inserting in a release request, as a parameter, an agent identification indicating the agent communication terminal equipment to be released; and
   communicating the release request from the interactive voice response system to the automatic call distribution system.

17. A method for incorporating functions of an automatic call distribution system in an interactive voice response system as claimed in claim 1, further comprising the steps of:
   inserting in a display request a parameter which includes at least one of agent identification identifying a specific agent communication terminal equipment, information to be displayed at the agent communication terminal equipment, an attention information effecting an attention tone at the affected agent communication terminal equipment; and
   communicating the display request from the interactive voice response system to the automatic call distribution system.

18. A method for incorporating functions of an automatic call distribution system in an interactive voice response system that is called and controlled by communication terminal equipment of a communication network, the method comprising the steps of:
   directly coupling the automatic call distribution system and the interactive voice response system;
   connecting both the interactive voice response system and the automatic call distribution system to a communication system of the communication network;
   connecting at least one agent communication terminal equipment to the communication system;
   allocating the at least one agent communication terminal equipment to the automatic call distribution system;
   influencing the interactive voice response system by the communication terminal equipment wherein the interactive voice response system communicates a request for reserving an available one of the at least one agent communication terminal equipment to the automatic call distribution system;
   reserving, via the automatic call distribution system, the available one of the at least one agent communication terminal equipment;
   transferring, given the request for reserving, and reservation of, the agent communication terminal equipment, by the communication system and outside of the automatic call distribution system the communication terminal equipment from the interactive voice response system to the reserved agent communication terminal equipment;
   providing interfaces to both the interactive voice response system and the automatic call distribution system; and
   coupling the respective interfaces of the interactive voice response system and the automatic call distribution system via a local area network.

19. A method for incorporating functions of an automatic call distribution system in an interactive voice response system that is called and controlled by communication terminal equipment of a communication network, the method comprising the steps of:
   directly coupling the automatic call distribution system and the interactive voice response system;
   connecting both the interactive voice response system and the automatic call distribution system to a communication system of the communication network;
   connecting at least one agent communication terminal equipment to the communication system;
   allocating the at least one agent communication terminal equipment to the automatic call distribution system;
   influencing the interactive voice response system by the communication terminal equipment wherein the interactive voice response system communicates a request for reserving an available one of the at least one agent communication terminal equipment to the automatic call distribution system;
   reserving, via the automatic call distribution system, the available one of the at least one agent communication terminal equipment;
   transferring, given the request for reserving, and reservation of, the agent communication terminal equipment, by the communication system and outside of the automatic call distribution system the communication terminal equipment from the interactive voice response system to the reserved agent communication terminal equipment;
   noting, given an unavailable agent communication terminal equipment, a call back request communicated from an associated communication terminal equipment in the interactive voice response system with telephone number information associated with the communication terminal equipment; and
   initiating an automatic call back with assistance from a further request for reserving, wherein a connection to the reserved agent communication terminal equipment is produced and transferred first and a call back connection to the associated terminal equipment is produced and transferred thereafter.

20. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment; and effecting transfer of the communication terminal equipment to the reserved agent communication terminal equipment by performance features of call back and transfer initialized by the interactive voice response system.

21. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

providing a request and an acknowledgment for each request for reserving between the interactive voice response system and the automatic call distribution system; and providing request information associated with the request, the request information including a request function code, version information indicating a current version of the interactive voice response system communicating the request, identification identifying the respective automatic call distribution system, identification identifying the respective interactive voice response system, reference information identifying the request, and at least one request-dependent parameter.

22. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

providing a request and an acknowledgment for each request for reserving between the interactive voice response system and the automatic call distribution system; and providing acknowledgment information associated with the request, the acknowledgment information including an acknowledgment function code, version information indicating a current version of the automatic call distribution system communicating the acknowledgment, identification identifying the respective automatic call distribution system, identification identifying the respective interactive voice response system, reference information identifying the acknowledgment, and at least one acknowledgment-dependent parameter.

23. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

inserting access protection information in a logon request;

communicating the logon request to log the interactive voice response system on at the automatic call distribution system;

inserting a check result of the logon request in a logon acknowledgment; and answering the logon request by the automatic call distribution system with the logon acknowledgment.

24. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

inserting access protection information in a log off request;

communicating the log off request to log the interactive voice response system off at the automatic call distribution system;

inserting a check result of the log off request in a log off acknowledgment; and answering the log off request by the automatic call distribution system with the log off acknowledgment.

25. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

inserting service information, in a status request, indicating a requested agent communication terminal equipment as a parameter;

communicating the status request, which includes the parameter, of the associated automatic call distribution system from the interactive voice response system to the automatic call distribution system; and communicating a status acknowledgment from the automatic call distribution system after the step of communicating a status request, wherein the status acknowledgment includes at least one of result information indicating a check of allowability of the status request, status information indicating an operating condition of the automatic call distribution system, agent information indicating the agent communication terminal equipment, report information indicating the agent communication terminal equipment, busy information indicating the agent communication terminal equipment, and availability information indicating the availability of the agent communication terminal equipment.

26. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment; and inserting in the reservation request a parameter which includes at least one of service information requesting an arbitrary agent communication terminal equipment of a group of agent communication terminal equipment, waiting information indicating a time span for waiting for one of a group of agent communication terminal equipment, and status information indicating one of the reporting and non-reporting of the status of the reservation request.

27. A method for incorporating functions of an automatic call distribution system in an interactive voice response system that is called and controlled by communication terminal equipment of a communication network, the method comprising the steps of:

directly coupling the automatic call distribution system and the interactive voice response system;

connecting both the interactive voice response system and the automatic call distribution system to a communication system of the communication network;

connecting at least one agent communication terminal equipment to the communication system;

allocating the at least one agent communication terminal equipment to the automatic call distribution system;

influencing the interactive voice response system by the communication terminal equipment wherein the interactive voice response system communicates a request for reserving an available one of the at least one agent communication terminal equipment to the automatic call distribution system;

reserving, via the automatic call distribution system, the available one of the at least one agent communication terminal equipment;

transferring, given the request for reserving, and reservation of, the agent communication terminal equipment, by the communication system and outside of the automatic call distribution system the communication terminal equipment from the interactive voice response system to the reserved agent communication terminal equipment;

inserting in a display request a parameter which includes at least one of agent identification identifying a specific agent communication terminal equipment, information to be displayed at the agent communication terminal equipment, an attention information effecting an attention tone at the affected agent communication terminal equipment; and communicating the display request from the interactive voice response system to the automatic call distribution system.

* * * * *